(12) United States Patent
Kamada (10) Patent No.: US 11,371,853 B2
(45) Date of Patent: Jun. 28, 2022

(54) INFORMATION PROCESSING DEVICE, INFORMATION PROCESSING METHOD AND PROGRAM

(71) Applicant: PIONEER CORPORATION, Tokyo (JP)

(72) Inventor: Takahiro Kamada, Tokyo (JP)

(73) Assignee: PIONEER CORPORATION, Tokyo (JP)

( * ) Notice: Subject to any disclaimer, the term of this patent is extended or adjusted under 35 U.S.C. 154(b) by 278 days.

(21) Appl. No.: 16/465,404

(22) PCT Filed: Nov. 28, 2017

(86) PCT No.: PCT/JP2017/042634
§ 371 (c)(1),
(2) Date: May 30, 2019

(87) PCT Pub. No.: WO2018/101264
PCT Pub. Date: Jun. 7, 2018

(65) Prior Publication Data
US 2019/0331498 A1    Oct. 31, 2019

(30) Foreign Application Priority Data
Nov. 30, 2016  (JP) .............................. JP2016-232764

(51) Int. Cl.
*G01C 21/32* (2006.01)
*G08G 1/01* (2006.01)
*G08G 1/0968* (2006.01)

(52) U.S. Cl.
CPC ........... *G01C 21/32* (2013.01); *G08G 1/0133* (2013.01); *G08G 1/0141* (2013.01); *G08G 1/096811* (2013.01)

(58) Field of Classification Search
CPC ..... G01C 21/32; G01C 21/30; G01C 21/3685; G01C 21/3438; G08G 1/0133;
(Continued)

(56) References Cited

U.S. PATENT DOCUMENTS 8,606,499 B2 *  12/2013  Li ........................... G08G 1/143
                                                                340/932.2
8,818,725 B2 *  8/2014   Ricci ................ G08G 1/096844
                                                                701/519
(Continued)

FOREIGN PATENT DOCUMENTS

JP    2005-172578 A    6/2005
JP    2007-093260 A    4/2007
(Continued)

OTHER PUBLICATIONS

Extended European Search Report issued in European Patent Application No. 17876137.5 dated Jun. 17, 2020.
(Continued)

*Primary Examiner* — Luis A Martinez Borrero
(74) *Attorney, Agent, or Firm* — Nixon & Vanderhye (57) ABSTRACT

The parking lot area is estimated based on the information acquired by driving vehicles. The information processing device acquires position information including a parking position from a movable body, and estimates parking lot information related to a parking lot existing in an out-of-road area based on the position information of plural movable bodies entered the out-of-road area. By analyzing movements and/or parking positions of the movable bodies in the out-of-road area, information related to the parking lot can be estimated.

11 Claims, 9 Drawing Sheets

(58) Field of Classification Search
CPC ............ G08G 1/0141; G08G 1/096811; G06F 16/29; G06F 16/5866; G06F 16/587; G06F 16/7837
See application file for complete search history.

(56) References Cited

U.S. PATENT DOCUMENTS

| | | | | |
|---|---|---|---|---|
| 8,847,790 | B2* | 9/2014 | Trum | G01C 21/3614 |
| | | | | 705/13 |
| 9,355,063 | B2* | 5/2016 | Scharmann | G08G 1/143 |
| 9,361,529 | B2* | 6/2016 | Ryu | G08G 1/168 |
| 9,759,569 | B2* | 9/2017 | Trum | G08G 1/09675 |
| 10,062,283 | B2* | 8/2018 | Mielenz | G08G 1/146 |
| 10,096,248 | B2* | 10/2018 | Penna | G08G 1/0129 |
| 10,650,680 | B2* | 5/2020 | Penna | H04W 84/005 |
| 10,718,624 | B2* | 7/2020 | Johnson | G08G 1/143 |
| 2009/0138497 | A1* | 5/2009 | Zavoli | G09B 29/106 |
| | | | | 707/999.102 |
| 2011/0063132 | A1* | 3/2011 | Trum | G01C 21/34 |
| | | | | 340/932.2 |
| 2013/0158853 | A1* | 6/2013 | Li | G08G 1/0129 |
| | | | | 340/932.2 |
| 2013/0211699 | A1* | 8/2013 | Scharmann | G06F 17/00 |
| | | | | 701/117 |
| 2014/0313060 | A1* | 10/2014 | Trum | G08G 1/096827 |
| | | | | 340/932.2 |
| 2015/0177002 | A1* | 6/2015 | Sourani | G01C 21/26 |
| | | | | 701/532 |
| 2016/0091324 | A1 | 3/2016 | Horihata et al. | |
| 2016/0364985 | A1* | 12/2016 | Penna | G06V 20/58 |
| 2017/0243488 | A1* | 8/2017 | Meijer | G08G 1/0129 |
| 2018/0102053 | A1* | 4/2018 | Hillman | G06Q 10/02 |
| 2018/0149483 | A1* | 5/2018 | Maier | G01C 21/32 |
| 2018/0374351 | A1* | 12/2018 | Penna | G08G 1/0112 |
| 2019/0195647 | A1* | 6/2019 | Johnson | G08G 1/147 |

FOREIGN PATENT DOCUMENTS

| | | |
|---|---|---|
| JP | 2008-164373 A | 7/2008 |
| JP | 2009-169527 A | 7/2009 |
| JP | 2010-003176 A | 1/2010 |
| JP | 2010-96890 A | 4/2010 |
| JP | 2011-065279 A | 3/2011 |
| JP | 2011-221014 A | 11/2011 |
| JP | 2012-68041 A | 4/2012 |
| JP | 2014-235510 A | 12/2014 |
| WO | 2014/192276 A | 12/2014 |
| WO | 2016/071512 A1 | 5/2016 |

OTHER PUBLICATIONS

International Search Report, dated Feb. 13, 2018, from corresponding PCT/JP2017/042634 application.

* cited by examiner

\<PROBE DATA\>

| Travel Distance [m] | Latitude [deg] | Longitude [deg] | Date and Time | Speed [km/h] | Travel Direction [deg] | Road Type | Back Flag |
|---|---|---|---|---|---|---|---|
| 1024087 | 139.7757268 | 35.62957019 | 2016/8/12 11:25:08 | 62 | 270 | 5 | 0 |
| 1024141 | 139.7752118 | 35.62933473 | 2016/8/12 11:25:11 | 60 | 271 | 5 | 0 |
| 1024199 | 139.7746646 | 35.6290644  | 2016/8/12 11:25:14 | 61 | 270 | 5 | 0 |
| 1024212 | 139.7745788 | 35.62896848 | 2016/8/12 11:25:17 | 52 | 272 | 5 | 0 |
| 1024243 | 139.7747505 | 35.6287243  | 2016/8/12 11:25:20 | 18 | 271 | 5 | 0 |
| 1024264 | 139.7748685 | 35.62856733 | 2016/8/12 11:25:23 | 13 | 185 | 4 | 0 |
| 1024288 | 139.7750938 | 35.6286807  | 2016/8/12 11:25:26 | 10 | 95  | 4 | 0 |
| 1024306 | 139.7752762 | 35.62875918 | 2016/8/12 11:25:29 | 15 | 97  | -1 | 0 |
| 1024321 | 139.7752762 | 35.62888999 | 2016/8/12 11:25:32 | 26 | 80  | -1 | 0 |
| 1024337 | 139.7752444 | 35.62903824 | 2016/8/12 11:25:35 | 25 | 68  | -1 | 0 |
| 1024357 | 139.7754157 | 35.62914288 | 2016/8/12 11:25:38 | 23 | 83  | -1 | 0 |
| 1024373 | 139.7755873 | 35.62919521 | 2016/8/12 11:25:41 | 22 | 110 | -1 | 0 |
| 1024391 | 139.7757375 | 35.62929113 | 2016/8/12 11:25:44 | 16 | 138 | -1 | 0 |
| 1024405 | 139.7758877 | 35.62932601 | 2016/8/12 11:25:47 | 14 | 171 | -1 | 0 |
| 1024419 | 139.7760165 | 35.62939578 | 2016/8/12 11:25:50 | 8  | 262 | -1 | 1 |
| 1024430 | 139.7761345 | 35.62939578 | 2016/8/12 11:25:53 | 0  | 270 | -1 | 1 |

OUT-OF-ROAD RUNNING (last rows bracketed)

FIG. 3

<PARKING LOT DATA>

| ID | Latitude [deg] | Longitude [deg] | Azimuth [deg] | Name |
|---|---|---|---|---|
| 5339001 | 139.7745091 | 35.62898156 | 310 | PARKING LOT A |
| 5339002 | 139.774906 | 35.62898156 | 60 | PARKING LOT B |
| 5339003 | 139.7722238 | 35.62716332 | 63 | PARKING LOT C |
| . | . | . | . | . |

EXTRACT PARKING
POSITIONS

FIG. 10B

DETECT POPULAR PARKING
POSITIONS
(LIGHT AREAS ARE POPULAR)

INFORMATION PROCESSING DEVICE, INFORMATION PROCESSING METHOD AND PROGRAM

TECHNICAL FIELD

The present invention relates to a technique of gathering information related to a parking lot.

BACKGROUND TECHNIQUE

In organizing map, in order to reflect shapes of buildings and areas of parking lots to the map data by a conventional method, it is necessary that workers draw a map based on aerial photographs and drawings of survey results. Particularly, as to the parking lots of facilities, it is difficult to organize map data of huge number of parking lots by hand. While it is possible to regard an area enclosed by roads as a pseudo parking lot area, this method is not effective if there are some parking lots in a single block.

Patent Reference-1 discloses a technique of estimating a width of new road, but does not disclose a technique of estimating a parking lot area.

PRIOR ART REFERENCES

Patent References

Patent Reference-1: Japanese Patent Application Laid-Open under No. 2008-164373

SUMMARY OF THE INVENTION

Problem to be Solved by the Invention

The above is an example of the problem to be solved by the present invention. It is an object of the present invention to estimate a parking lot area based on information acquired by driving vehicles.

Means for Solving the Problem

An invention described in claims is an information processing device comprising: an acquirement unit configured to acquire position information including a parking position from a movable body; and an estimation unit configured to estimate parking lot information related to a parking lot existing in an out-of-road area based on the position information of plural movable bodies entered the out-of-road area.

Another invention described in claims is an information processing method executed by an information processing device, comprising: an acquirement process of acquiring position information including a parking position from a movable body; and an estimation process of estimating parking lot information related to a parking lot existing in an out-of-road area based on the position information of plural movable bodies entered the out-of-road area.

Still another invention described in claims is a program executed by an information processing device comprising a computer, the program causing the computer to function as: an acquirement unit configured to acquire position information including a parking position from a movable body; and an estimation unit configured to estimate parking lot information related to a parking lot existing in an out-of-road area based on the position information of plural movable bodies entered the out-of-road area.

DETAILED DESCRIPTION OF THE PREFERRED EMBODIMENTS

According to one aspect of the present invention, there is provided an information processing device comprising: an acquirement unit configured to acquire position information including a parking position from a movable body; and an estimation unit configured to estimate parking lot information related to a parking lot existing in an out-of-road area based on the position information of plural movable bodies entered the out-of-road area.

The above information processing device acquires position information including a parking position from a movable body, and estimates parking lot information related to a parking lot existing in an out-of-road area based on the position information of plural movable bodies entered the out-of-road area. By this information processing device, by analyzing movements and/or parking positions of the movable bodies in the out-of-road area, information related to the parking lot can be estimated.

In one mode of the above information processing device, the estimation unit estimates a whole area of the parking lot based on the parking positions of the plural movable bodies. In this mode, based on the parking positions of the movable bodies, the whole area of the parking lot can be estimated.

In another mode of the above information processing device, the estimation unit estimates a parking area and a running area in the parking lot based on the position information of the movable body after entering the out-of-road area until parking. In this mode, the parking area and the running area in the parking lot can be discriminated.

In still another mode of the above information processing device, the estimation unit estimates the parking position of high utilization rate based on density of the parking positions. In this mode, the place where the density of the parking positions is high can be estimated as the place of high utilization rate.

In still another mode of the above information processing device, the estimation unit estimates the parking position of high utilization rate based on parking time of the movable bodies. In this mode, the place where the parking time is long can be estimated as the place of high utilization rate.

Still another mode of the above information processing device further comprises a storage unit configured to store the parking lot information, wherein the estimation unit estimates the parking lot information based on the position information recently acquired in a predetermined time period or from a predetermined number of the movable bodies, and compares the estimated parking lot information with past parking lot information stored in the storage unit to detect a difference. In this mode, when the parking lot area is changed, the parking lot information in the map data can be updated by using the difference.

Still another mode of the above information processing device further comprises an output unit configured to output the parking lot information to an outside, wherein the parking lot information includes caution information related to the parking lot. In this mode, the caution information related to the parking lot can be outputted to an external terminal device.

According to another aspect of the present invention, there is provided an information processing method executed by an information processing device, comprising: an acquirement process of acquiring position information including a parking position from a movable body; and an estimation process of estimating parking lot information related to a parking lot existing in an out-of-road area based on the position information of plural movable bodies entered the out-of-road area. By this method, by analyzing movements and/or parking positions of the movable bodies in the out-of-road area, information related to the parking lot can be estimated.

According to still another aspect of the present invention, there is provided a program executed by an information processing device comprising a computer, the program causing the computer to function as: an acquirement unit configured to acquire position information including a parking position from a movable body; and an estimation unit configured to estimate parking lot information related to a parking lot existing in an out-of-road area based on the position information of plural movable bodies entered the out-of-road area. By executing this program by the computer, the above information processing device can be realized. This program can be handled in a manner stored in a storage medium.

Embodiment

A preferred embodiment of the present invention will be described below with reference to the attached drawings.

[System Configuration]

Figure 1A:
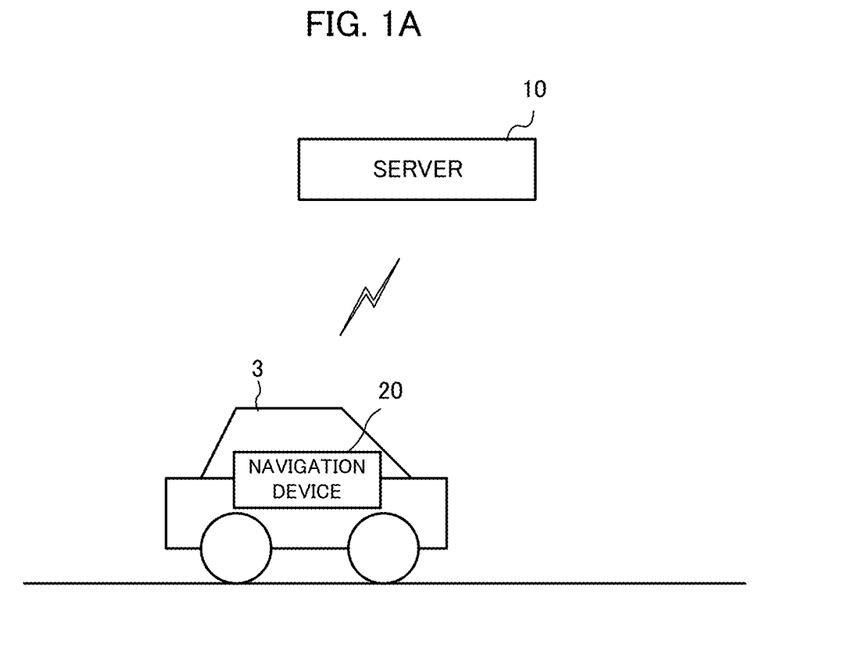
FIGS. 1A and 1B illustrate a configuration of an information processing system according to an embodiment.

FIG. 1A illustrates a configuration of an information processing system according to the present invention. The information processing system includes a server 10 and a navigation device 20. The server 10 and the navigation device 20 can wirelessly communicate with each other. While only one vehicle 3 is shown in FIG. 1A for convenience of explanation, actually a lot of vehicles 3 communicate with the server 10.

Figure 1B:
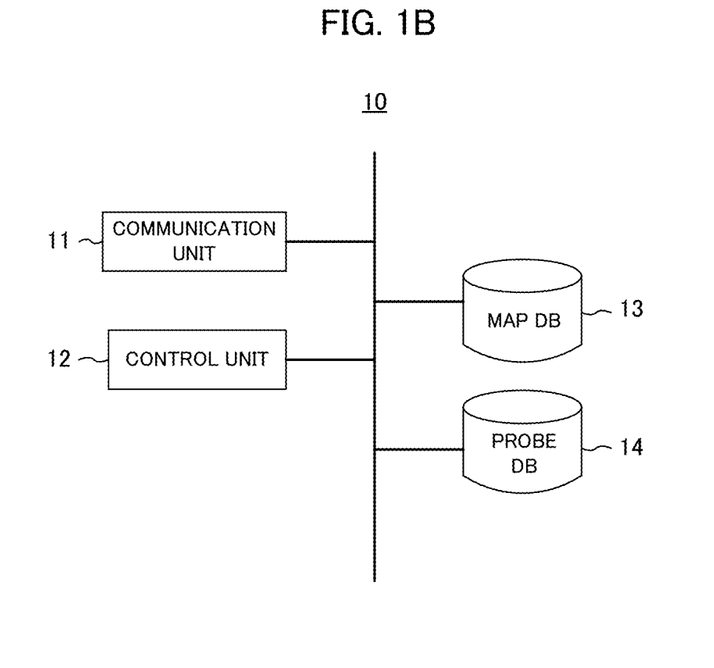

FIG. 1B illustrates a configuration of the server 10. The server 10 includes a communication unit 11, a control unit 12, a map database ("database" will be hereinafter referred to as "DB") 13 and a probe DB 14.

The communication unit 11 receives the probe data from the navigation device 20. The probe data is generated by the navigation device 20 when the vehicle 3 travels. The map DB 13 stores the map data. As the map data, in addition to the link data indicating the links corresponding to the road and the node data corresponding to the intersections, parking lot data related to the parking lots are stored. The probe DB 14 stores the probe data received from a lot of navigation devices 20.

The control unit 12 controls the server 10 as a whole. The control unit 12 includes a computer such as a CPU, and performs predetermined processing by executing programs prepared in advance. Specifically, the control unit 12 performs the processing of receiving the probe data from the navigation devices 20, and the processing of estimating the parking lot area based on the probe data stored in the probe DB 14.

[Probe Data]

Figure 2:
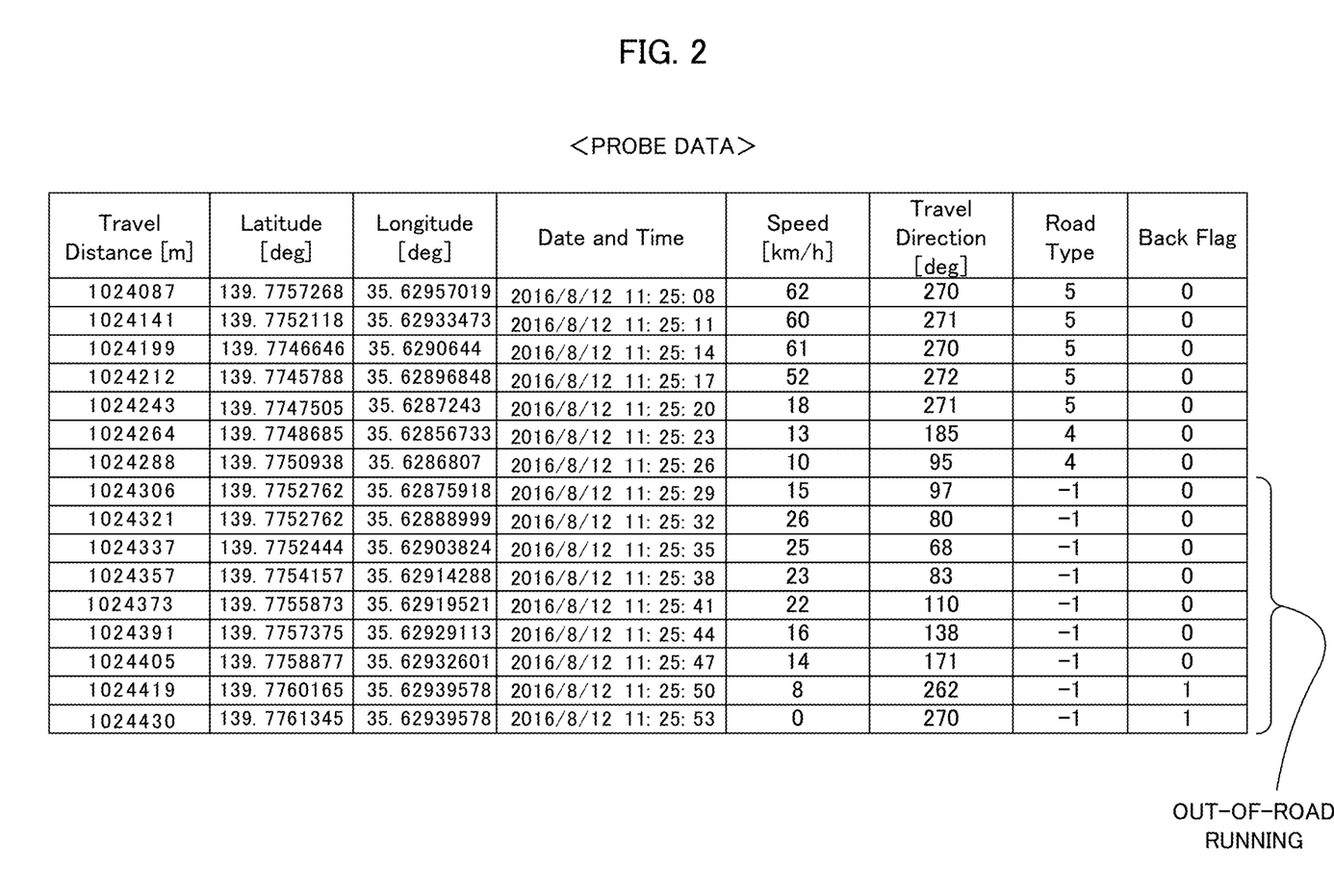
FIG. 2 shows an example of probe data.

Next, the probe data will be described. FIG. 2 shows an example of the probe data. The probe data is generated by the navigation device 20 at every predetermined time (e.g., every few seconds) while the vehicle 3 travels. The example in FIG. 2 shows the probe data at plural points, generated at every predetermined time. As shown, the probe data includes "Travel Distance", "Latitude", "Longitude", "Date and Time", "Speed", "Travel Direction", "Road Type" and "Back Flag".

"Travel Distance" is a travel distance of the vehicle 3, and the accumulated travel distance measured by the odometer is used. "Latitude" and "Longitude" indicate the latitude and the longitude of the position of the vehicle 3. "Date and Time" indicates the data and the time at which each probe data is generated. "Speed" is the speed of the vehicle 3 at the time of the measurement. "Travel Direction" indicates the travel direction of the vehicle 3 at the time of the measurement. The travel direction is given by the azimuth for which the north direction is 0 degree.

"Road Type" is information indicating the type of the road on which the vehicle 3 is traveling, and is determined such that the highway is "1", the toll road is "2", the national road is "3", the prefectural road is "4" and the city road is "5". In this embodiment, the road type is set to "−1" when the vehicle 3 is running the area out of the roads. Therefore, when the road type is "−1", the vehicle is running out of the road.

"Back Flag" is a flag indicating whether or not the vehicle 3 is moving backward. The back flag "0" indicates the forward movement, and the back flag "1" indicates the backward movement. The back flag is generated based on whether or not the gear of the vehicle 3 is in the back (reverse) position.

[Parking Lot Data]

Figure 3:
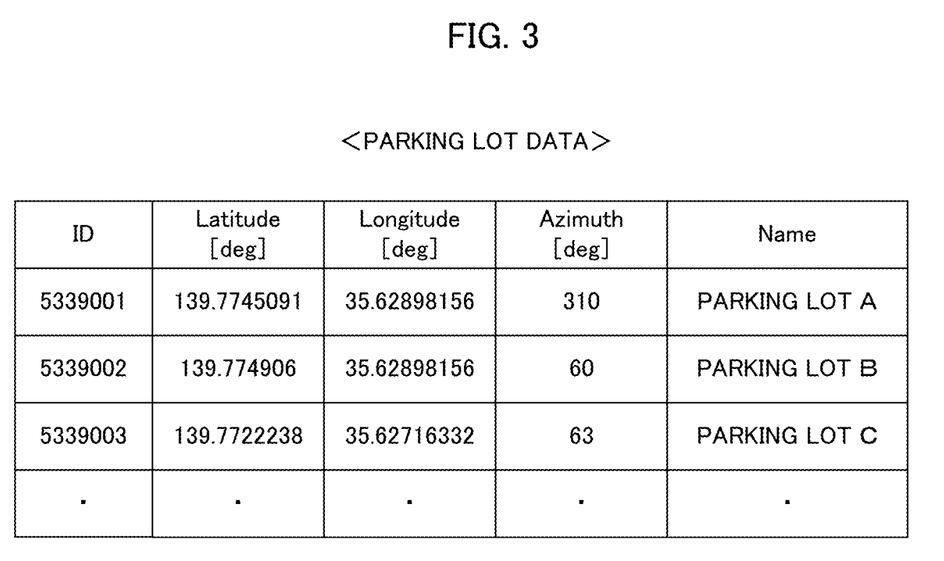
FIG. 3 shows an example of parking lot data.

Next, parking lot data will be described. FIG. 3 shows an example of the parking lot data. The parking lot data is prepared for each entrance of the parking lot. Therefore, if one parking lot has plural entrances, plural parking lot data are prepared for one parking lot. As shown, the parking lot data includes "ID", "Latitude", "Longitude", "Azimuth" and "Name".

"ID" is an identification number uniquely indicates the entrance of the parking lot. "Latitude" and "Longitude" are the latitude and the longitude of the entrance of the parking lot. "Azimuth" indicates the direction of the vehicle 3 which enters the parking lot from the entrance. For example, if the entrance of the parking lot is facing north, the vehicle 3 runs from the north side of the parking lot in the south direction and enters the parking lot, and therefore the azimuth of the entrance is the south direction. In this example, the azimuth is expressed by the angle for which the north direction is defined as 0 degree.

"Name" is the name of the parking lot. While the parking lot data are prepared for each entrance of the parking lot in the example of FIG. 3, the parking lot data may be prepared for each parking lot. However, even in that case, the parking lot data include the latitude, the longitude and the azimuth of the entrance of the parking lot. Namely, the parking lot data include information indicating the position and the direction of the entrance or entrances (if there are plural) of the parking lot.

[Parking Lot Area Estimation Processing]

Figure 4:
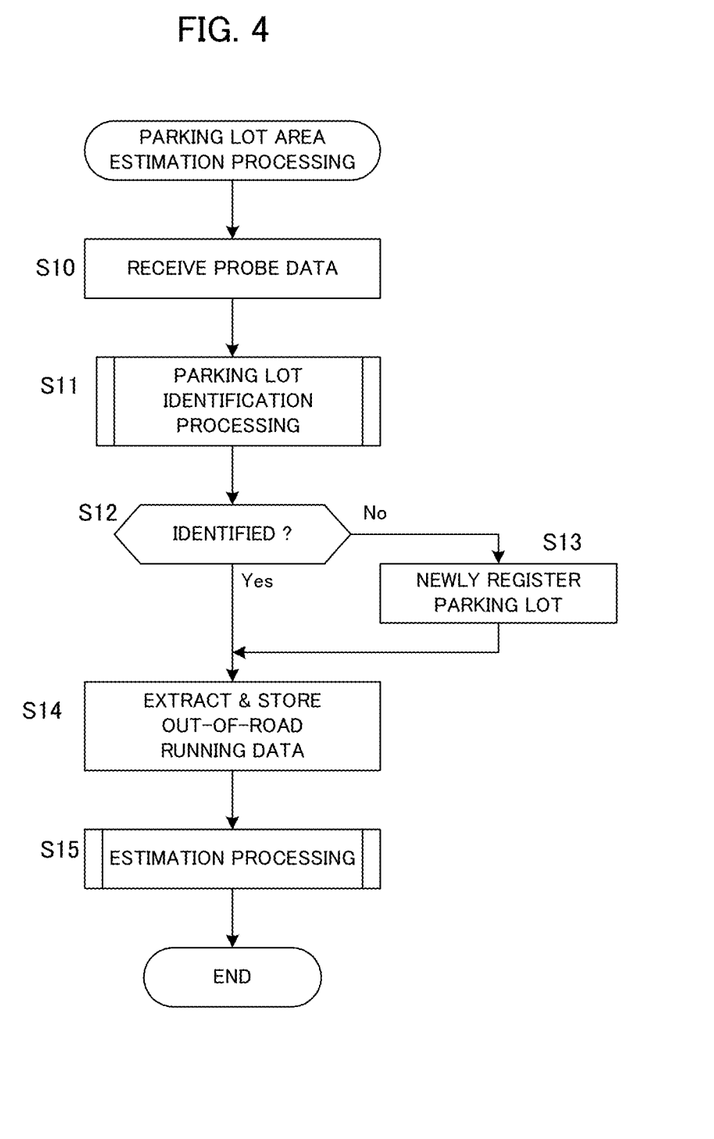
FIG. 4 is a flowchart of parking lot area estimation processing.

Next, parking lot area estimation processing will be described. The parking lot area estimation processing is executed by the server 10 to estimate the area of the parking lot based on the probe data acquired from plural vehicles 3. This processing is mainly executed by the control unit 12 in the server 10. Actually, this processing is realized by a computer, such as a CPU forming the control unit 12, which executes a program prepared in advance.

First, the server 10 receives the probe data from plural vehicles 3 by wireless communication (step S10). The server 10 stores the received probe data in the probe data DB 14.

Figure 5A:
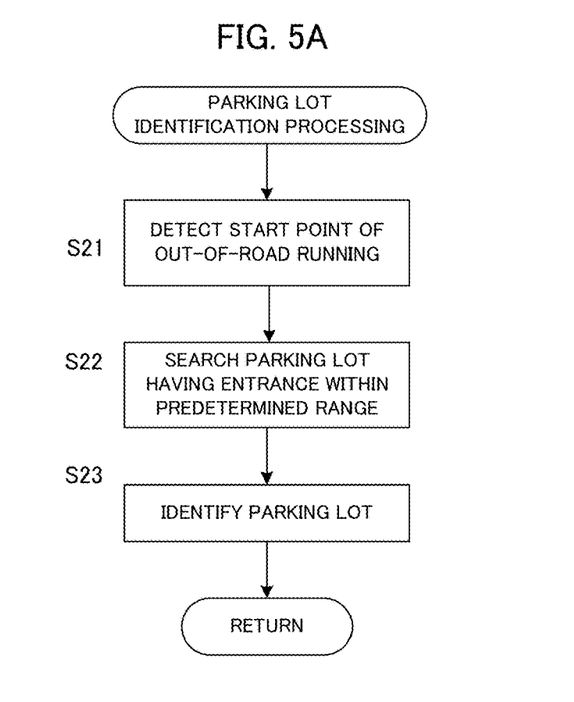
FIGS. 5A and 5B are flowcharts of parking lot identification processing and estimation processing.

Next, the server 10 performs parking lot identification (step S11). The parking lot identification processing is to identify the parking lot from the probe data and the parking lot data in the map data. FIG. 5A shows the detail of the parking lot identification processing. First, the server 10 detects the start point of the running out of the roads (hereinafter also referred to as "out-of-road running") based on the probe data (step S21).

Figure 6:
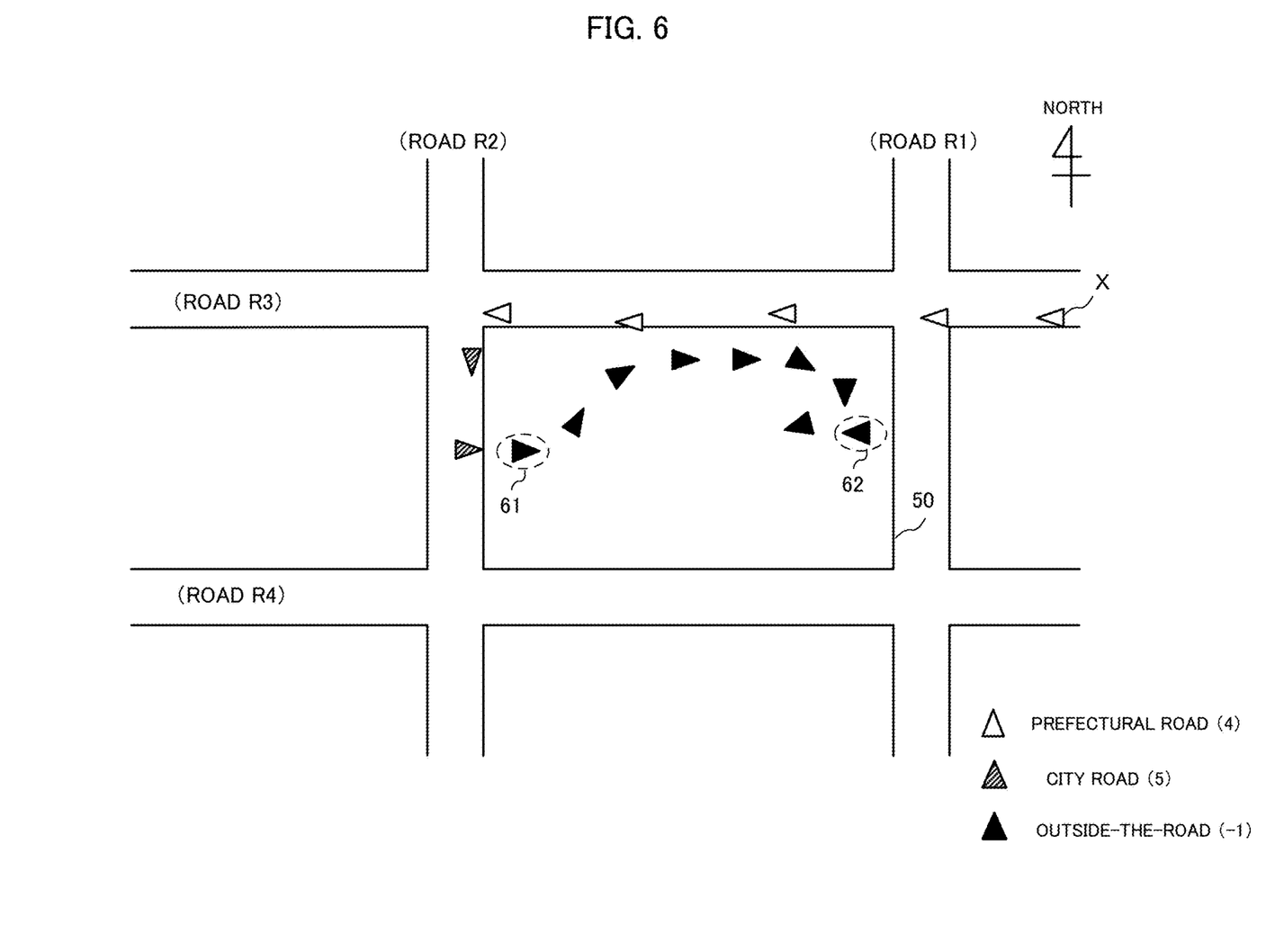
FIG. 6 is a diagram for explaining out-of-road running.

FIG. 6 is a diagram explaining the out-of-road running. As shown, plural roads cross each other, and the roads running north-south and the roads running east-west form plural blocks (sites). The vehicle mark X shows the position of the vehicle 3 given by the probe data. The white vehicle mark X shows the position on the prefectural road, and the probe data at the position includes the road type "4 (prefectural road)". The obliquely-hatched vehicle mark X shows the position on the city road, and the probe data at the position includes the road type "5 (city road)". The black vehicle mark X shows the position out of the roads, and the probe data at the position includes the road type "−1 (out of the roads)".

Now, it is supposed that the vehicle 3 runs west on the road R3 (prefectural road), turns left at the intersection of the roads R2 and R3 to enter the road R2 (city road), turns left again to enter the block 50 of a parking lot, and runs in the parking lot to finally park with facing the west direction (see. the broken line ellipse 62). In this case, the server 10 refers to the probe data indicating the running locus shown in FIG. 6, and determines the point where the road type becomes "−1 (out of the road)" for the first time (i.e., the point of the broken line ellipse 61 in FIG. 6) as the start point of the out-of-road running.

Next, the server 10 refers to the parking lot data in the map DB 13, and searches for a parking lot which has an entrance within a range of a predetermined threshold from the coordinates of the start point of the out-of-road running obtained in step S21 (step S22). Then, from the plural parking lots obtained by the search, the server 10 identifies a parking lot having an entrance which is directed to the same direction as the running direction of the vehicle 3 at the start point of the out-of-road running and which is closest to the start point of the out-of-road running (step S23). Then, the processing returns to the main routine shown in FIG. 4.

Next, the server 10 determines whether or not the parking lot identification processing in step S11 could identify a parking lot, i.e., could find a corresponding parking lot (step S12). If the corresponding parking lot is not found (step S12: No), the server 10 determines that the parking lot indicated by the probe data obtained this time has not been registered in the map DB 13, and registers the parking lot to the map DB 13 (step S13). Specifically, the server 10 generates new parking lot data and registers it to the map DB 13. At that time, in the new parking lot data, a new ID is assigned, the coordinates of the start point of the out-of-road running are set to the "Latitude" and "Longitude", the running direction of the vehicle 3 at the start point of the out-of-road running is set to the "Azimuth" and a name of a facility closest to the start point of the out-of-road running is set to the "Name".

When the parking lot is newly registered in step S13 or when the parking lot is identified in step S12, the server 10 extracts the out-of-road running data from the probe data and stores it in the probe DB 14 (step S14). In the example of FIG. 2, the data of the point having the road type "−1" is stored as the out-of-road running data.

Figure 5B:
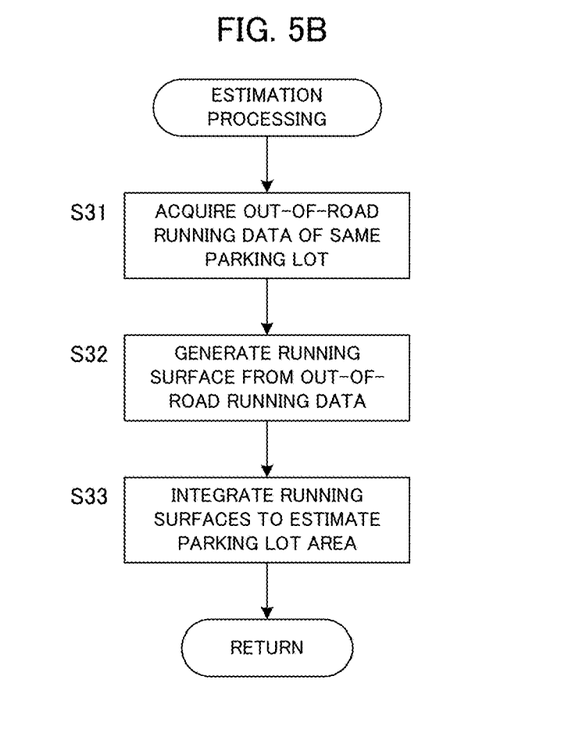
Figure 7A:
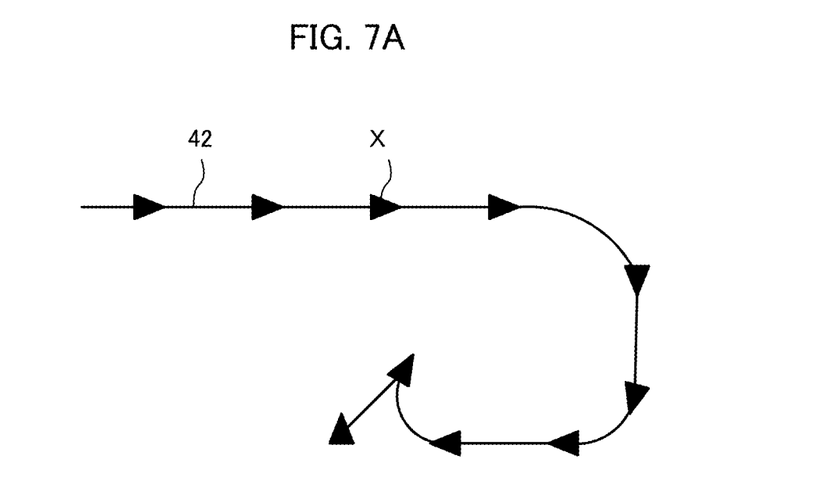
FIGS. 7A and 7B are diagrams for explaining a method of estimation a parking lot area.
Figure 7B:
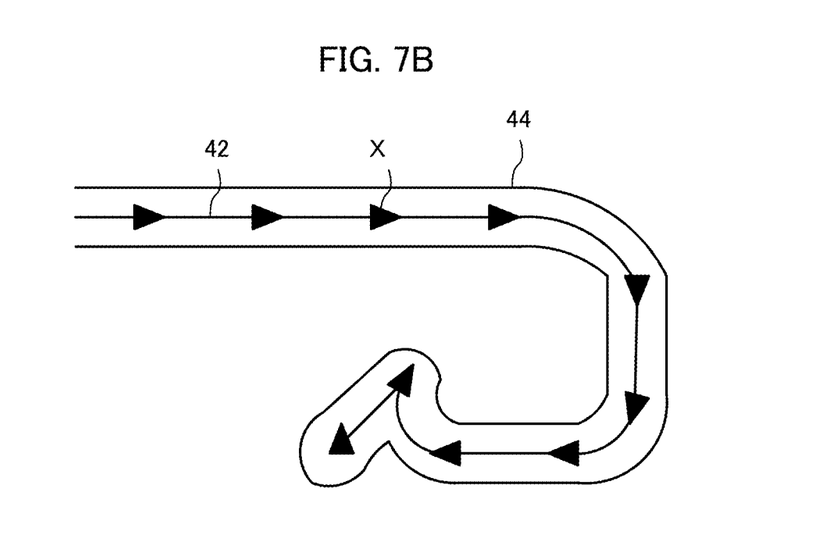

Next, the server 10 performs estimation processing by using the out-of-road running data (step S15). FIG. 5B is a flowchart of the estimation processing. First, the server 10 acquires the out-of-road running data obtained for the same parking lot from the probe DB 14 (step S31). Next, the server 10 generates running surfaces based on each of the out-of-road running data (step S32). Here, the "running surface" is a surface having a constant distance from the coordinates, serving as a center, included in the out-of-road running data. Supposing that the out-of-road running data has the locus 42 shown in FIG. 7A, the server 10 generates the running surface 44 by adding the width of a standard vehicle to the locus 42. The server 42 generates the running surface 44 for each of the out-of-road running data.

Figure 8:
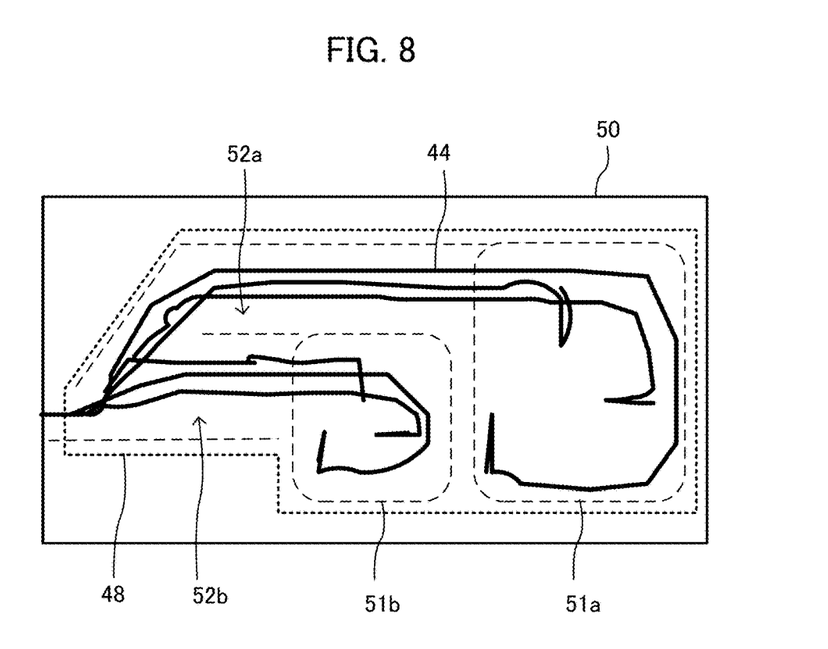
FIG. 8 shows an example of estimating the parking lot area from plural running surfaces.

Then, the server 10 spatially integrates plural running surfaces 44 generated in step S32 to estimate the parking lot area (step S33). FIG. 8 shows an example of estimating the parking lot area from plural running surfaces 44, in which plural running surfaces 44 obtained in the same parking lot are shown. In this example, it is possible to discriminate an area in which the vehicle 3 moves roughly straight and an area in which the vehicle 3 turns to park. Therefore, the server 10 estimates the area in which the vehicle turns to park as a parking area 51, and estimates the area in which the vehicle 3 moves roughly straight as a running area 52. In the example of FIG. 8, two parking areas 51a, 51b are detected, and two running areas 52a, 52b corresponding to each of them are also detected.

Generally, when the vehicle is parked, the vehicle moves at a certain speed to the parking position. However, when the vehicle is turned to park, the speed of the vehicle is sufficiently low. Therefore, the parking areas 51 and the running areas 52 may be discriminated not only by the positional coordinates of the vehicle 3, but also by the speed of the vehicle in the out-of-road running data.

By combining one or plural parking area 51 with one or plural running area 52, the whole shape of the parking lot may be estimated. In the example of FIG. 8, the whole shape of the parking lot is obtained as the shape of dotted area 48. When the parking lot area is thus estimated, the parking lot area estimation processing ends.

As described above, according to this embodiment, the parking lot area may be estimated based on the probe data, i.e., travel history of plural vehicles. Also, in addition to the whole shape of the parking lot area, the running area and the parking area in the parking lot area may be discriminated.

[Estimating Parking Positions of High Utilization Rate]

Next, description will be given of a method of estimating parking positions of high utilization rate (high popularity) in the estimated parking lot area. In a parking lot, there are popular parking positions and non-popular parking positions due to various reasons, e.g., the parking lot is close to the entrance of the facility or the parking lot has a roof. Therefore, the server 10 collects the actual parking points of the vehicle 3 in each parking lot and calculates the density of the vehicle 3 to estimate the popular positions and the non-popular positions in the parking lot.

Figure 9:
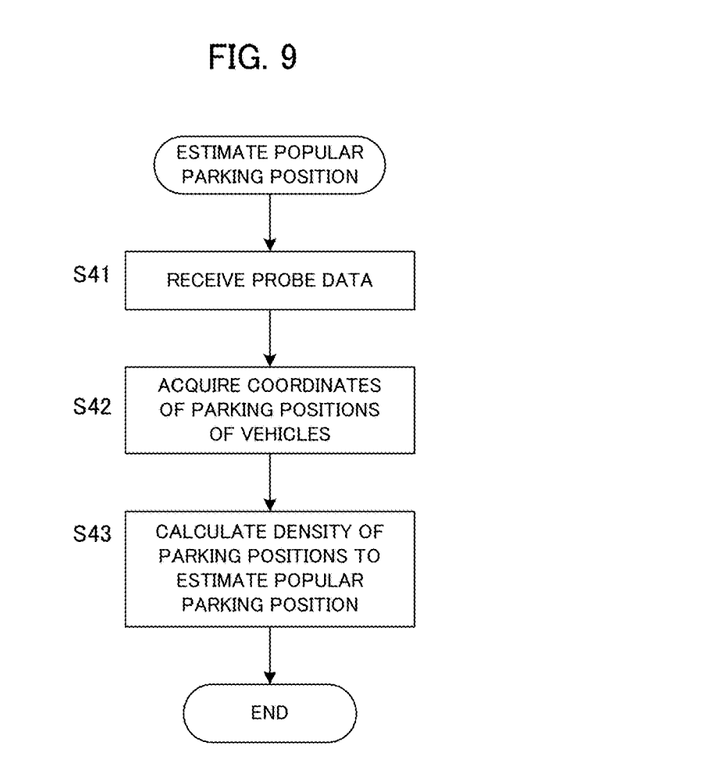
FIG. 9 is a flowchart of estimation processing of popular parking positions.

FIG. 9 shows an example of processing of estimating popular parking positions. This processing is executed by the server 10. First, the server 10 receives the probe data from the navigation devices 20 of the vehicles 3 (step S41).

Figure 10A:
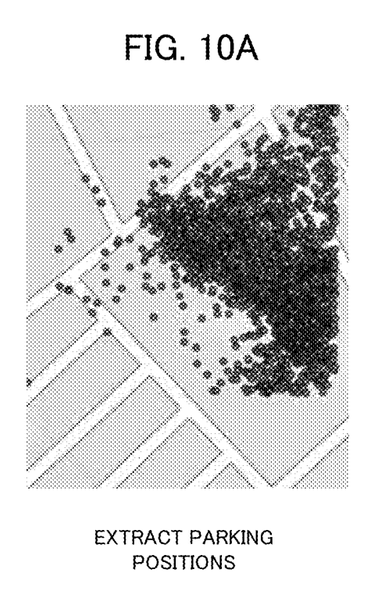
FIGS. 10A and 10B show an example of estimating the popular parking positions.

Next, the server 10 acquires the coordinates of the parking positions of the plural vehicles 3 (step S42). Specifically, the server 10 determines the point at which the speed in the probe data becomes "0" as the parking position of the vehicle 3, and regards the latitude and the longitude of the point as the coordinates of the parking position. In order to distinguish from the simple "stopping" occurring when the driver is waiting the parking of the preceding vehicle, it is preferable that the server 10 determines the state of the vehicle staying at a speed lower than a predetermined speed for more than a predetermined time period as the parking. For example, the server 10 determines that the vehicle is parking when the state of the vehicle whose speed is lower than 1 km/h continues more than 3 minutes. FIG. 10A shows an example of extracting the parking positions.

Next, the server 10 calculates the density of the coordinates of the parking positions acquired in step S42 and estimates the popular parking positions (step S43). For example, the server 10 calculates the density of the parking positions of the vehicles on the space of the parking lot by using kernel density estimation. Then, the processing ends.

Figure 10B:
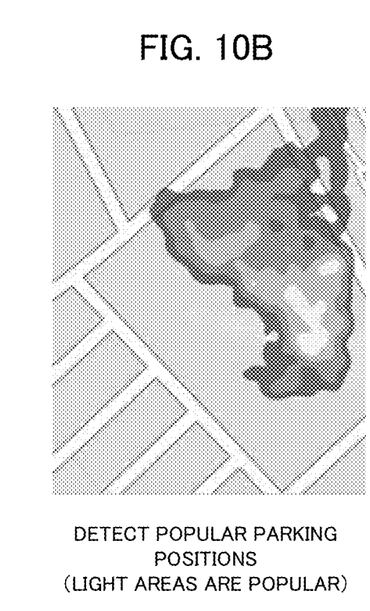

FIG. 10B schematically shows a result of calculating the density of the parking positions based on the parking position data shown in FIG. 10A. In FIG. 10B, as the color of the area becomes lighter, the parking position has higher density and are more popular.

In the above example, the popular parking positions (having high utilization rate) are estimated based on the density of the parking positions. Instead, the popular parking positions may be estimated based on the length of the parking time. Normally, it is possible to think that the utilization rate is higher as the parking time is longer. Therefore, the server 10 may extracts the parking positions at which the parking time is long based on the probe data, and may estimate that those positions are the parking positions of high utilization rate.

The distribution information of the parking positions and the information of popular parking positions acquired as described above may be used for various purposes such as examination of measures to prevent congestion of the parking lot or disperse the parking positions and examination of changing the positions of the entrances and/or increasing the entrances of the parking lot.

[Parking Lot Information Updating Processing]

Next, description will be given of an example of utilizing the estimated parking lot information for updating map. When the parking lot area estimated from the traveling data of a predetermined time period (e.g., last one year) is different from the parking lot area estimated from the traveling data before the predetermined time period, it is estimated that the actual parking lot area is changed and the stored parking lot area is updated. Specifically, the change may be expansion or reduction of the parking lot, or change of parking sections. Also, the running area and the parking area, as well as the popular parking positions may be updated.

As described above, by taking account on the change of the parking lot area, the latest information may be effectively used in re-organizing the parking lot map and/or updating the map information. Further, by taking account on the change of the popular parking positions, the latest information may be effectively used to cope with an environmental change of the parking lot.

[Utilization to Advanced Map]

Next, description will be given of an embodiment to produce advanced map information in the parking lot by further utilizing sensing information such as LiDAR. By utilizing LiDAR, it is possible to produce advanced map information in the parking lot from white line information. However, only from the sensing information, it is difficult to detect an attribute of the parking lot having use condition, e.g., a monthly parking lot. Therefore, the attribute of the parking lot is detected by utilizing the travel information like the above-described embodiment. For example, when the parking information is acquired from plural movable bodies, it is possible to estimate that the parking lot is for general use. By this, the attribute of the parking lot may be applied to the advanced map.

By utilizing the travel history for the parking lot without white lines or a temporary parking lot, the parking lot information may be specified more accurately.

Further, by utilizing the sensing information, it is possible to detect the height of the car wheel stopper in the parking area or the height of the roof, and they may be used for producing the advanced map together with the travel information indicating the parking history. Still further, by utilizing the travel information indicating the travel history together with the detection of the longitudinal gradient existing at the entrance of the parking floor, accurate caution information such as caution of bottom rubbing may be generated.

[Notifying Caution Information in Parking Lot]

From the travel information in the parking lot, it is possible to produce information of the places where sudden acceleration or deceleration occurs. This may be used to call user's attention while guiding the parking lot, or to notify the user that the parking lot has a lot of such information and is not recommended, thereby contributing to safe driving by the user. In view of the speed information, pedestrians need to carefully walk in a parking lot in which the average speed of the vehicle is high. In such a parking lot, it is possible to call user's attention by notifying that the user needs to be careful when walking in the parking lot.

While the server generates information related to the parking lot using the probe information in the above embodiment, a terminal device provided at the parking lot may collect data by communication and generate information related to the parking lot. Also, the terminal device loaded on the vehicle may transmit data only when it becomes necessary.

BRIEF DESCRIPTION OF REFERENCE NUMBERS

3 Vehicle
10 Server
12 Control unit
13 Map DB
14 Probe DB
20 Navigation device

The invention claimed is:

1. An information processing device comprising:
   one or more processors configured to
      receive position information wirelessly transmitted from navigation devices in a plurality of movable bodies, the position information including respective parking positions of the respective movable bodies, generate running surfaces from the wirelessly transmitted position information, detect a parking area in a parking lot existing in an out-of-road area based on the received position information indicating the movable bodies entered the out-of-road area, turned, and stopped, the parking area being detected based on the generated running surfaces, detect a running area in the parking lot based on the received position information indicating the movable bodies entered the out-of-road area and are moving forward without turning to park, the running area being detected based on the generated running surfaces, and estimate parking lot information related to a shape of the parking lot, the shape of the parking lot being obtained by combining the detected parking area and the detected running area, and output the estimated parking lot information to a display as map data or store the estimated parking lot information to a map database.

2. The information processing device according to claim 1, wherein the one or more processors estimates an entire area of the parking lot based on the parking positions of the plurality of movable bodies.

3. The information processing device according to claim 1, wherein the one or more processors estimates a high utilization rate of at least one specific parking position of the plurality of parking positions based on a density of each of the parking positions.

4. The information processing device according to claim 1, wherein the one or more processors estimates a high utilization rate of at least one specific parking position of the plurality of parking positions based on parking times of the plurality of movable bodies.

5. The information processing device according to claim 1, further comprising a storage configured to store the parking lot information, wherein the one or more processors estimates the parking lot information based on the position information recently acquired in a predetermined time period or from a predetermined number of the movable bodies, and compares the estimated parking lot information with past parking lot information stored in the storage to detect a difference.

6. The information processing device according to claim 1, further comprising an output configured to output the parking lot information to an outside, wherein the parking lot information includes caution information related to the parking lot.

7. The information processing device according to claim 1, wherein the one or more processors is further configured to receive the speed of each of the movable bodies and detect the parking area and the running area based on the received speeds of the movable bodies.

8. An information processing method executed by an information processing device, comprising:

receiving, at one or more processors, position information wirelessly transmitted from navigation devices in a plurality of movable bodies, the position information including respective parking positions of the respective movable bodies;

generating running surfaces from the wirelessly transmitted position information, detecting a parking area in a parking lot existing in an out-of-road area based on the received position information indicating the movable bodies entered the out-of-road area, turned, and stopped, the parking area being detected based on the generated running surfaces;

detecting a running area in the parking lot based on the received position information indicating the movable bodies entered the out-of-road area and are moving forward without turning to park, the running area being detected based on the generated running surfaces; and estimating parking lot information related to a shape of the parking lot, the shape of the parking lot being obtained by combining the detected parking area and the detected running area; and outputting the estimated parking lot information to a display as map data or storing the estimated parking lot information to a map database.

9. The method according to claim 8, further comprising receiving the speed of each of the movable bodies and detecting the parking area and the running area based on the received speeds of the movable bodies.

10. A non-transitory computer-readable medium storing a program executed by an information processing device comprising a computer, the program causing the computer to:

receive position information wirelessly transmitted from navigation devices in a plurality of movable bodies, the position information including respective parking positions of the respective movable bodies;

generate running surfaces from the wirelessly transmitted position information;

detect a parking area in a parking lot existing in an out-of-road area based on the received position information indicating the movable bodies entered the out-of-road area, turned, and stopped, the parking area being detected based on the generated running surfaces;

detect a running area in the parking lot based on the received position information indicating the movable bodies entered the out-of-road area and are moving forward without turning to park, the running area being detected based on the generated running surfaces;

estimate parking lot information related to a shape of the parking lot, the shape of the parking lot being obtained by combining the detected parking area and the detected running area; and output the estimated parking lot information to a display as map data or store the estimated parking lot information to a map database.

11. The non-transitory computer-readable medium according to claim 10, wherein the computer is further configured to receive the speed of each of the movable bodies and detect the parking area and the running area based on the received speeds of the movable bodies.

* * * * *